(12) United States Patent
Lee et al.

(10) Patent No.: US 12,404,359 B2
(45) Date of Patent: Sep. 2, 2025

(54) RUBBER POLYMER, METHOD FOR PREPARING THEREOF, AND RUBBER COMPOSITION COMPRISING THE SAME

(71) Applicant: Korea Kumho Petrochemical Co., Ltd., Seoul (KR)

(72) Inventors: Han Baek Lee, Daejeon (KR);
Hoo-Chae Kim, Daejeon (KR);
Seung-Hwon Lee, Daejeon (KR);
Seung Hyun Do, Daejeon (KR);
Daejune Joe, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 46 days.

(21) Appl. No.: 17/508,148

(22) Filed: Oct. 22, 2021

(65) Prior Publication Data
US 2022/0127403 A1 Apr. 28, 2022

(30) Foreign Application Priority Data

Oct. 22, 2020 (KR) .................. 10-2020-0137818
Oct. 19, 2021 (KR) .................. 10-2021-0139655

(51) Int. Cl.
| | |
|---|---|
| *C08F 279/02* | (2006.01) |
| *C08C 19/20* | (2006.01) |
| *C08C 19/25* | (2006.01) |
| *C08C 19/26* | (2006.01) |
| *C08F 136/06* | (2006.01) |
| *C08L 7/00* | (2006.01) |
| *C08L 9/06* | (2006.01) |
| *C08L 51/04* | (2006.01) |

(52) U.S. Cl.
CPC ............ *C08F 279/02* (2013.01); *C08C 19/20* (2013.01); *C08C 19/25* (2013.01); *C08C 19/26* (2013.01); *C08F 136/06* (2013.01); *C08L 7/00* (2013.01); *C08L 9/06* (2013.01); *C08L 51/04* (2013.01)

(58) Field of Classification Search
CPC ........ C08F 136/06; C08F 4/545; C08L 15/00; C08L 7/00; C08L 9/06; C08L 91/00; C08K 3/04; C08K 3/22; C08K 5/09; C08K 3/06; C08K 3/36; C08K 5/31; C08K 5/47

See application file for complete search history.

(56) References Cited

U.S. PATENT DOCUMENTS

| | | | | |
|---|---|---|---|---|
| 2014/0364573 A1* | 12/2014 | Kloppenburg | .......... | C08L 55/02 473/351 |
| 2017/0107358 A1* | 4/2017 | Ambe | ........................ | C08L 7/00 |
| 2018/0066077 A1* | 3/2018 | Choi | ........................ | C08K 3/36 |

FOREIGN PATENT DOCUMENTS

| | | | | |
|---|---|---|---|---|
| CN | 110903423 A | * | 3/2020 | ............ C08F 136/06 |
| JP | 2004256608 A | * | 9/2004 | |
| JP | 2012087200 A | | 5/2012 | |
| KR | 20180074040 A | * | 7/2018 | |

\* cited by examiner

*Primary Examiner* — Marc S Zimmer
*Assistant Examiner* — Surbhi M Du
(74) *Attorney, Agent, or Firm* — NKL Law; Jae Youn Kim

(57) ABSTRACT

Disclosed are a rubber polymer including a unit structure derived from a conjugated diene-based monomer and at least one of compounds represented by Chemical Formula 1 to Chemical Formula 4, a method of preparing the same, and a rubber composition including the same.

9 Claims, No Drawings

RUBBER POLYMER, METHOD FOR PREPARING THEREOF, AND RUBBER COMPOSITION COMPRISING THE SAME

CROSS-REFERENCE TO RELATED APPLICATION

This application claims priority to and the benefit of Korean Patent Application No. 2020-0137818, filed on Oct. 22, 2020 and Korean Patent Application No. 2021-0139655, filed on Oct. 19, 2021, the disclosures of which are incorporated herein by reference in their entirety.

BACKGROUND

1. Field of the Invention

The present invention relates to a rubber polymer, a method of preparing the same, and a rubber composition including the same.

2. Discussion of Related Art

As demand for rubber compositions increases in various fields of manufacturing tires, shoe soles, golf balls, and the like, the value of a conjugated diene-based polymer, which is synthetic rubber, as a substitute for natural rubber whose yield is insufficient is rising.

Generally, the structure of the conjugated diene-based polymer greatly affects the properties of the polymer. As the degree of branching is higher, the dissolution rate and viscosity of the polymer increase, resulting in enhancement of the processability of the polymer. However, when the degree of branching of the polymer is high, the polymer is likely to have a wide molecular weight distribution, and thus the mechanical properties of the polymer, which affect the abrasion resistance, crack resistance, or repulsive properties of a rubber composition, are rather degraded.

A high-cis conjugated diene-based polymer having a high cis bond content, for example, a cis bond content of 90 wt % or more, has a linear structure, and products manufactured from such a high-cis conjugated diene-based polymer exhibit excellent properties, whereas the viscosity and cold flowability thereof are high, leading to poor processability, poor compatibility with a reinforcing agent, and poor storage.

That is, when other conditions are the same, the linearity or degree of branching of the conjugated diene-based polymer highly depends on the content of a cis bond included in the polymer. As the content of a cis bond in the conjugated diene-based polymer is higher, linearity increases, and thus the polymer has excellent mechanical properties, resulting in enhancement of the abrasion resistance, crack resistance, repulsive properties, and the like of a rubber composition.

Accordingly, various methods of preparing a conjugated diene-based polymer for improving mechanical properties by increasing the content of a cis bond in a conjugated diene-based polymer and simultaneously imparting appropriate processability have been researched and developed. For example, there has been proposed a method of preparing a conjugated diene-based polymer having high linearity by using a polymerization system including a rare earth lanthanide element-containing compound, especially, a neodymium-based compound, or using a polymerization system including a nickel-based compound.

The specification was written by finding that the simultaneous improvement of processability and mechanical properties which are a trade-off relationship is possible by applying a functional compound to a conjugated diene-based polymer having a high cis bond content to induce an intermolecular chain bond and adjusting a molecular weight and a molecular weight distribution.

SUMMARY OF THE INVENTION

The present invention is directed to providing a rubber polymer, whose productivity, processability, mechanical properties, and viscoelasticity are excellent, and a rubber composition including the same.

One aspect of the present invention provides a rubber polymer including a unit structure derived from a conjugated diene-based monomer and at least one of compounds represented by the following Chemical Formula 1 to Chemical Formula 4:

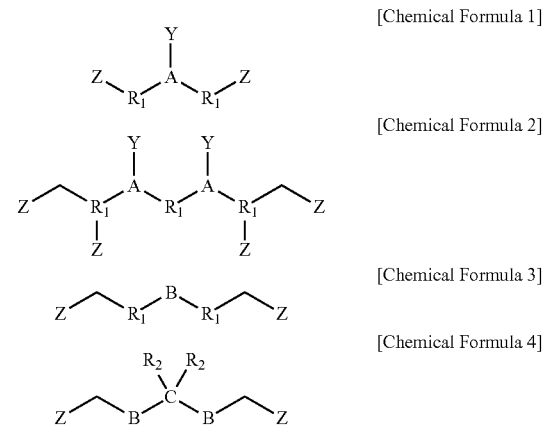

[Chemical Formula 1]

[Chemical Formula 2]

[Chemical Formula 3]

[Chemical Formula 4]

In the Chemical Formulas, A is nitrogen or phosphorus, B is oxygen or sulfur, C is silicon or tin, Y is hydrogen, $-R_2$, $-Si(R_2)_3$, or $-R_1Si(OR_2)_3$, Z is a functional group represented by the following Chemical Formula Z,

[Chemical Formula Z]

each $R_1$ is independently a C1 to C10 linear or branched substituted or unsubstituted alkylene group, and each $R_2$ is independently a C1 to C20 linear or branched substituted or unsubstituted alkyl group, a C3 to C20 substituted or unsubstituted cycloalkyl group, or a C6 to C20 substituted or unsubstituted aryl group.

In an embodiment, the conjugated diene-based monomer may be at least one selected from the group consisting of 1,3-butadiene, isoprene, 2,3-dimethyl-1,3-butadiene, 2,3-dimethylbutadiene, 2-phenyl-1,3-butadiene, 2-chloro-1,3-butadiene, 1,3-pentadiene, 2-methyl-1,3-pentadiene, 3-methyl-1,3-pentadiene, 4-methyl-1,3-pentadiene, 1,3-hexadiene, 2-ethyl-1,3-butadiene, 2,4-hexadiene, and cyclo1,3-hexadiene.

In an embodiment, the rubber polymer may satisfy one of the following conditions (i) to (iv):
(i) the compound represented by Chemical Formula 1 has a symmetric structure centered on A;

(ii) the compound represented by Chemical Formula 2 has a symmetric structure centered on $R_1$;
(iii) the compound represented by Chemical Formula 3 has a symmetric structure centered on B; and
(iv) the compound represented by Chemical Formula 4 has a symmetric structure centered on C.

In an embodiment, the rubber polymer may have a cis bond content of 90% or more.

In an embodiment, the rubber polymer may have a degree of branching of 1.5 to 2.5.

Another aspect of the present invention provides a method of preparing a rubber polymer, comprising the steps of: (a) allowing a conjugated diene-based monomer to react in the presence of a catalyst; and (b) allowing the product of the step (a) to react with at least one of compounds represented by the following Chemical Formula 1 to Chemical Formula 4: the descriptions about Chemical Formulas 1 to 4 are as described above.

In an embodiment, the catalyst may be a neodymium-based catalyst prepared from a unimolecular neodymium salt compound.

In an embodiment, the unimolecular neodymium salt compound may be at least one selected from the group consisting of neodymium hexanoate, neodymium heptanoate, neodymium octanoate, neodymium octoate, neodymium naphthenate, neodymium stearate, neodymium versatate, neodymium bis(2-ethylhexyl)phosphate, neodymium bis(1-methylheptyl)phosphate, neodymium (mono-2-ethylhexyl-2-ethylhexyl)phosphonate, and neodymium bis(2-ethylhexyl)phosphite.

In an embodiment, the catalyst may be formed by mixing the unimolecular neodymium salt compound, a conjugated diene-based monomer, an organoaluminum chloride compound, and one or more organoaluminum compounds in a molar ratio of 1:5 to 30:1 to 5:10 to 30 and aging the mixture.

Still another aspect of the present invention provides a rubber composition including: the above-described rubber polymer; at least one second rubber selected from the group consisting of natural rubber, polybutadiene rubber, polyisoprene rubber, butyl rubber, ethylene-propylene-diene ternary copolymer rubber, and styrene-butadiene rubber; and a reinforcing agent.

DETAILED DESCRIPTION OF EXEMPLARY EMBODIMENTS

Hereinafter, an aspect of the present invention will be described with reference to embodiments. However, the present invention may have various embodiments and thus is not limited to the embodiments described herein.

Throughout the specification, a certain part being "connected" to another part means that the certain part is "directly connected" to the other part or that the certain part is "indirectly connected" to the other part through another member interposed between the two parts. Also, a certain part "including" a certain element signifies that the certain part may further include, instead of excluding, another element unless particularly indicated otherwise.

When a numerical value is presented herein, the value has the precision of the significant digit provided in accordance with the standard rules in chemistry for significant digits unless its specific range is stated otherwise. For example, the numerical value 10 includes the range of 5.0 to 14.9, and the numerical value 10.0 includes the range of 9.50 to 10.49.

Rubber Polymer

A rubber polymer according to one aspect includes a unit structure derived from a conjugated diene-based monomer and at least one of compounds represented by the following Chemical Formula 1 to Chemical Formula 4.

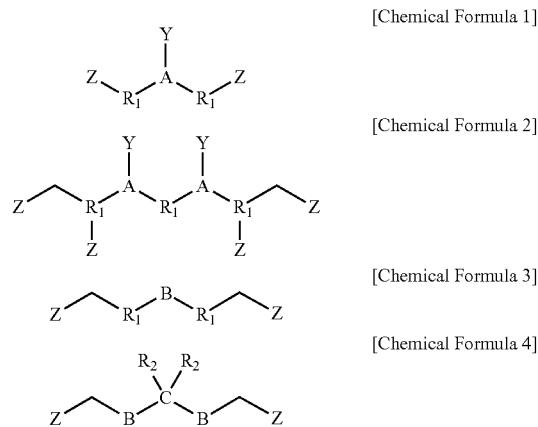

[Chemical Formula 1]
[Chemical Formula 2]
[Chemical Formula 3]
[Chemical Formula 4]

In the Chemical Formulas, A is nitrogen (N) or phosphorus (P), B is oxygen (O) or sulfur (S), C is silicon (Si) or tin (Sn), Y is hydrogen, $-R_2$, $-Si(R_2)_3$, or $-R_1Si(OR_2)_3$, Z is a functional group represented by the following Chemical Formula Z,

[Chemical Formula Z]

each $R_1$ is independently a C1 to C10 linear or branched substituted or unsubstituted alkylene group, and each $R_2$ is independently a C1 to C20 linear or branched substituted or unsubstituted alkyl group, a C3 to C20 substituted or unsubstituted cycloalkyl group, or a C6 to C20 substituted or unsubstituted aryl group.

For example, $R_1$ may be: a linear alkylene group such as a methylene group, an ethylene group, a 1,3-propylene group, a 1,4-butylene group, a 1,5-pentamethylene group, a 1,6-hexamethylene group, a 1,7-heptamethylene group, a 1,8-octamethylene group, a 1,9-nonamethylene group, a 1,10-decamethylene group, or the like; a branched alkylene group such as a 1,2-propylene group, a 1,2-butylene group, a 1,3-butylene group, a 1,2-pentylene group, a 1,3-pentylene group, a 1,4-pentylene group, a 1,2-hexylene group, a 1,3-hexylene group, a 1,4-hexylene group, a 1,5-hexylene group, a 1,2-heptylene group, a 1,3-heptylene group, a 1,4-heptylene group, a 1,5-heptylene group, a 1,6-heptylene group, a 1,2-octylene group, a 1,3-octylene group, a 1,4-octylene group, a 1,5-octylene group, a 1,6-octylene group, a 1,7-octylene group, a 1,2-nonylene group, a 1,3-nonylene group, a 1,4-nonylene group, a 1,5-nonylene group, a 1,6-nonylene group, a 1,7-nonylene group, a 1,8-nonylene group, a 1,2-decylene group, a 1,3-decylene group, a 1,4-decylene group, a 1,5-decylene group, a 1,6-decylene group, a 1,7-decylene group, a 1,8-decylene group, a 1,9-decylene group, a 2-methylbutane-1,4-diyl group, a 2-ethylbutane-1,4-diyl group, a 2-methylpentane-1,5-diyl group, a 3-methylpentane-1,5-diyl group, or the like; or the linear alkylene group or branched alkylene group in which at least one carbon is substituted with a heteroatom such as nitrogen, oxygen, sulfur, halogen, or the like, but the present invention is not limited thereto.

For example, $R_2$ may be: a linear alkyl group such as a methyl group, an ethyl group, a 1-propyl group, a 1-butyl group, a 1-pentyl group, a 1-hexyl group, a 1-heptyl group, a 1-octyl group, a 1-nonyl group, a 1-decyl group, a 1-undecyl group, a 1-dodecyl group, a 1-trideceyl group, a 1-tetradeceyl group, a 1-pentadeceyl group, a 1-hexadeceyl group, a 1-heptadeceyl group, a 1-octadeceyl group, a 1-nonadeceyl group, a 1-eicoseyl group, or the like; a branched alkyl group such as a 2-methylpropyl group, a 2-ethylpropyl group, a 2-methylbutyl group, a 2,3-dimethylbutyl group, a 2-ethylbutyl group, a 2-ethyl-3-methylbutyl group, a 2-propylbutyl group, a 2-isopropylbutyl group, a 2-methylpentyl group, a 2,3-dimethylpentyl group, a 2,4-dimethylpentyl group, a 3,4-dimethylpentyl group, a 2-ethyl-3-methylpentyl group, a 2-methyl-3-ethylpentyl group, a 3-ethyl-4-methylpentyl group, a 2-ethylpentyl group, a 2-propylpentyl group, a 2-isopropylpentyl group, a 2-butylpentyl group, a 2-methylhexyl group, a 2-ethylhexyl group, a 2-propylhexyl group, a 2-butylhexyl group, a 2-methylheptyl group, a 2-ethylheptyl group, a 2-propylheptyl group, a 2-methyloctyl group, a 2-ethyloctyl group, a 2-methylnonyl group, a 3-methylbutyl group, a 3-ethylbutyl group, a 3-propylbutyl group, a 3-methylpentyl group, a 3-ethylpentyl group, a 3-propylpentyl group, a 3-butylpentyl group, a 3-methylhexyl group, a 3-ethylhexyl group, a 3-propylhexyl group, a 3-butylhexyl group, a 3-methylheptyl group, a 3-ethylheptyl group, a 3-propylheptyl group, a 3-methyloctyl group, a 3-ethyloctyl group, a 3-methylnonyl group, a 4-methylpentyl group, a 4-ethylpentyl group, a 4-propylpentyl group, a 4-butylpentyl group, a 4-methylhexyl group, a 4-ethylhexyl group, a 4-propylhexyl group, a 4-butylhexyl group, a 4-methylheptyl group, a 4-ethylheptyl group, a 4-propylheptyl group, a 4-methyloctyl group, a 4-ethyloctyl group, a 4-methylnonyl group, a 5-methylhexyl group, a 5-ethylhexyl group, a 5-propylhexyl group, a 5-butylhexyl group, a 5-methylheptyl group, a 5-ethylheptyl group, a 5-propylheptyl group, a 5-methyloctyl group, a 5-ethyloctyl group, a 5-methylnonyl group, a 6-methylheptyl group, a 6-ethylheptyl group, a 6-propylheptyl group, a 6-methyloctyl group, a 6-ethyloctyl group, a 6-methylnonyl group, a 7-methyloctyl group, a 7-ethyloctyl group, a 7-methylnonyl group, a 8-methylnonyl group, or the like; a cycloalkyl group such as a cyclopropyl group, a cyclobutyl group, a cyclopentyl group, a cyclohexyl group, a cycloheptyl group, a cyclooctyl group, a cyclononyl group, a cyclodecyl group, or the like; an aryl group such as a benzyl group, a tolyl group, a naphthyl group, an azulyl group, an anthracyl group, a fluoryl group, a phenalyl group, a pyryl group, or the like; or the linear alkyl group, branched alkyl group, cycloalkyl group, or aryl group in which at least one carbon is substituted with a heteroatom such as nitrogen, oxygen, sulfur, halogen, or the like, but the present invention is not limited thereto.

The rubber polymer may be a conjugated diene-based polymer functionalized with at least one of compounds represented by Chemical Formula 1 to Chemical Formula 4. The compounds represented by Chemical Formula 1 to Chemical Formula 4 may introduce two or more ester groups having high reactivity to the active site of the polymer. The compounds may implement a high functionalization rate (denaturation rate) of the polymer and thus may effectively induce molecular control. The compounds may be introduced into the polymer chain to uniformly increase the dispersibility with a reinforcing agent, resulting in significant improvement in processability, elasticity, and mechanical properties in preparation of a rubber composition.

As an example, when Y in the compound of Chemical Formula 1 or 2 is a silicon (Si)-containing functional group, A is protected in the form of —NSi—, —PSi—, or the like, and thus a relatively high denaturation rate may be implemented. As a result, molecular properties may be more effectively controlled.

As another example, when B in the compound of Chemical Formula 3 or 4 is sulfur (S), the —S— structure or —SSn— structure promotes the denaturation of the rubber polymer, and thus a high denaturation rate may be implemented. A compound in which B is oxygen (O) or a compound in which C is silicon (Si) also promotes the denaturation of the rubber polymer, and thus a similar effect may be implemented.

In an embodiment, the rubber polymer may satisfy the following conditions (i) to (iv):
 (i) the compound represented by Chemical Formula 1 has a symmetric structure centered on A;
 (ii) the compound represented by Chemical Formula 2 has a symmetric structure centered on $R_1$;
 (iii) the compound represented by Chemical Formula 3 has a symmetric structure centered on B; and
 (iv) the compound represented by Chemical Formula 4 has a symmetric structure centered on C.

Such a symmetric structure may improve a functionalization rate at which the compound is introduced to the polymer. As a result, the properties of the functionalized rubber polymer may be effectively improved.

The conjugated diene-based monomer may be at least one selected from the group consisting of 1,3-butadiene, isoprene, 2,3-dimethyl-1,3-butadiene, 2,3-dimethylbutadiene, 2-phenyl-1,3-butadiene, 2-chloro-1,3-butadiene, 1,3-pentadiene, 2-methyl-1,3-pentadiene, 3-methyl-1,3-pentadiene, 4-methyl-1,3-pentadiene, 1,3-hexadiene, 2-ethyl-1,3-butadiene, 2,4-hexadiene, and cyclo1,3-hexadiene.

As used herein, the cis bond may mean a bond in which structures connected to both ends of a double bond portion in the main chain of a unit derived from the conjugated diene-based monomer in the rubber polymer are on the same side. For example, in the unit structure of polybutadiene, a bond in which carbon 1 and carbon 4 are positioned on the same side with respect to a 2-3 double bond interposed therebetween may be referred to as a 1,4-cis bond.

The rubber polymer may have a cis bond content of 90 wt % or more, 91 wt % or more, 92 wt % or more, 93 wt % or more, 94 wt % or more, 95 wt % or more, or 96 wt % or more. As the content of cis bond in the rubber polymer is higher, the heat generation resistance and elasticity of a final product may be enhanced.

Generally, in the case of a rubber polymer having a high cis bond content, the mechanical properties of a product manufactured from the same are excellent, whereas the viscosity and cold flowability thereof are high, and thus productivity and storage stability are poor, affinity for and compatibility with a reinforcing agent and dispersibility of a filler are also poor, and the mechanical properties and dynamic properties of a final product are degraded. However, the rubber polymer functionalized with the compounds represented by Chemical Formula 1 to Chemical Formula 4 exhibits excellent processability and excellent compatibility with a reinforcing agent while having a high cis bond content, and thus the mechanical properties and dynamic properties of a final product may be harmoniously improved.

The rubber polymer may have a degree of branching of 1.5 to 2.5 or more, for example, 1.5, 1.6, 1.7, 1.8, 1.9, 2.0, 2.1, 2.2, 2.3, 2.4, 2.5, or a range between two thereof. Generally, a rubber polymer having a high cis bond content exhibits insufficient processability. In the case of the rubber polymer of the present invention, a degree of branching may be increased by inducing an intermolecular chain bond through functionalization with a functional compound. As a result, processability is improved, and thus the properties of a final product may be excellent.

The degree of branching of the rubber polymer may be measured by various methods. As an example, Mooney viscosity (MV) and solution viscosity (SV) at 25° C. are measured, the ratio of the measured results is multiplied by 10 to obtain a value (MV/SV*10), and the value may be referred to as a degree of branching.

The rubber polymer may have a molecular weight distribution (Mw/Mn) of 1.50 to 3.0, for example, 1.50, 1.55, 1.60, 1.65, 1.70, 1.75, 1.80, 1.85, 1.90, 1.95, 20, 2.05, 2.10, 2.15, 2.20, 2.25, 2.30, 2.35, 2.40, 2.45, 2.50, 2.55, 2.60, 2.65, 2.70, 2.75, 2.80, 2.85, 2.90, 2.95, 3.0 or a range between two thereof. When the molecular weight distribution satisfies the above-described range, the mechanical properties of a final product can be excellent.

The rubber polymer may be formed by chain bonding of functionalized polymer molecules having a narrow molecular weight distribution due to high linearity. As a result, the rubber polymer has a high degree of branching and a uniform molecular weight, and thus mechanical properties may be excellent.

Method of Preparing Rubber Polymer

A method of preparing a rubber polymer according to another aspect includes the steps of: (a) allowing a conjugated diene-based monomer to react in the presence of a catalyst; and (b) allowing the product of the step (a) to react with at least one of compounds represented by the following Chemical Formula 1 to Chemical Formula 4.

The descriptions about the conjugated diene-based monomer and compounds represented by Chemical Formulas 1 to 4 are as described above.

The step (a) is intended to initiate polymerization of a conjugated diene-based monomer under a catalyst system. Since the product of the step (a) includes a catalytic active site having a living property, any functional compounds represented by Chemical Formula 1 to Chemical Formula 4 may be introduced to functionalize a polymer chain, thereby adjusting molecules in the step (b). Accordingly, the degree of branching and molecular structure of a polymer may be controlled, and thus chemical and physical reactivity with a reinforcing agent may be adjusted.

The catalyst may be a neodymium-based catalyst prepared from a unimolecular neodymium salt compound. The neodymium-based catalyst is a compound prepared by coordination between a central metal element and a ligand, and the unimolecular neodymium salt compound may be at least one selected from the group consisting of neodymium hexanoate, neodymium heptanoate, neodymium octanoate, neodymium octoate, neodymium naphthenate, neodymium stearate, neodymium versatate, neodymium bis(2-ethylhexyl)phosphate, neodymium bis(l-methylheptyl)phosphate, neodymium (mono-2-ethylhexyl-2-ethylhexyl)phosphonate, and neodymium bis(2-ethylhexyl)phosphite, but the present invention is not limited thereto.

The neodymium-based catalyst may be a catalyst formed by mixing the neodymium salt compound, a conjugated diene-based monomer, an organoaluminum chloride compound, and one or more organoaluminum compounds in a predetermined molar ratio, for example, in a molar ratio of 1:5 to 30:1 to 5:10 to 30, and aging the mixture under certain conditions.

The catalyst may be formed by adding the conjugated diene-based monomer in an amount of 5 to 30 moles, for example, 5 moles, 6 moles, 7 moles, 8 moles, 9 moles, 10 moles, 11 moles, 12 moles, 13 moles, 14 moles, 15 moles, 16 moles, 17 moles, 18 moles, 19 moles, 20 moles, 21 moles, 22 moles, 23 moles, 24 moles, 25 moles, 26 moles, 27 moles, 28 moles, 29 moles, 30 moles, or a range between two thereof, based on 1 mole of the unimolecular neodymium salt compound and aging the mixture, but the present invention is not limited thereto.

The catalyst may be formed by adding the organoaluminum chloride compound in an amount of 1 to 5 moles, for example, 1 mole, 2 moles, 3 moles, 4 moles, 5 moles, or a range between two thereof, based on 1 mole of the unimolecular neodymium salt compound and aging the mixture, but the present invention is not limited thereto.

The catalyst may be formed by adding the one or more organoaluminum compounds in an amount of 10 to 30 moles, for example, 10 moles, 11 moles, 12 moles, 13 moles, 14 moles, 15 moles, 16 moles, 17 moles, 18 moles, 19 moles, 20 moles, 21 moles, 22 moles, 23 moles, 24 moles, 25 moles, 26 moles, 27 moles, 28 moles, 29 moles, 30 moles, or a range between two thereof, based on 1 mole of the unimolecular neodymium salt compound and aging the mixture, but the present invention is not limited thereto.

A solvent for forming the catalyst is not particularly limited and may be a non-polar solvent, an aliphatic hydrocarbon, a cycloaliphatic hydrocarbon, benzene, ethylbenzene, toluene, xylene, or the like which is not reactive with the catalyst. For example, the solvent may be at least one selected from the group consisting of pentane, hexane, isopentane, heptane, octane, isooctane, cyclopentane, methylcyclopentane, cyclohexane, methylcyclohexane, and ethylcyclohexane.

The organoaluminum chloride compound may be at least one selected from the group consisting of diethylaluminum chloride, dimethylaluminum chloride, dipropylaluminum chloride, diisobutylaluminum chloride, dihexylaluminum chloride, dioctyl aluminum chloride, ethylaluminum dichloride, methylaluminum dichloride, propylaluminum dichloride, isobutylaluminum dichloride, hexylaluminum dichloride, octylaluminum dichloride, ethylaluminum sesquichloride, methylaluminum sesquichloride, propylaluminum sesquichloride, isobutylaluminum sesquichloride, hexylaluminum sesquichloride, and octylaluminum sesquichloride, but the present invention is not limited thereto.

The organoaluminum compound or organoaluminoxane may be at least one selected from the group consisting of trimethylaluminum, triethylaluminum, tripropylaluminum, tributylaluminum, triisobutylaluminum, trihexylaluminum, trioctylaluminum, diisobutylaluminum hydride, dimethylaluminum hydride, diethylaluminum hydride, dipropylaluminum hydride, dibutylaluminum hydride, diisobutylaluminum hydride, dihexylaluminum hydride, dioctylaluminum hydride, methylaluminoxane (MAO), modified methylaluminoxane (MMAO), ethylaluminoxane, propylaluminoxane, isobutylaluminoxane, isobutylaluminoxane, hexylaluminoxane, and octylaluminoxane, but the present invention is not limited thereto.

Rubber Composition

A rubber composition according to still another aspect includes: the above-described rubber polymer; at least one second rubber selected from the group consisting of natural rubber, polybutadiene rubber, polyisoprene rubber, butyl rubber, ethylene-propylene-diene ternary copolymer rubber, and styrene-butadiene rubber; and a reinforcing agent.

The rubber polymer uniformly improves dispersibility with the reinforcing agent through the substitution and coupling reaction of the end of the chain with a functional compound, and thus processability, elasticity, and mechanical properties may be excellent in preparation of the rubber composition.

Generally, a polymer having a high cis bond content exhibits excellent properties due to having high linearity and viscosity, but the productivity thereof may be degraded. Specifically, storage may be poor due to high cold flowability, and compound properties may be adversely affected due to poor processability. On the other hand, the rubber polymer of the present invention exhibits increased affinity for the reinforcing agent by substituting the end of a polymer chain with a functional group compound, and thus compound processability, viscoelasticity, and mechanical properties may be excellent.

A weight ratio of the rubber polymer and the second rubber may be 10 to 70:30 to 90, for example, 10:90, 15:85, 20:80, 25:75, 30:70, 35:65, 40:60, 45:55, 50:50, 55:45, 60:40, 65:35, or 70:30, but the present invention is not limited thereto.

The reinforcing agent may be at least one selected from the group consisting of carbon black, carbon nanotubes, silica, calcium carbonate, clay, aluminum hydroxide, lignin, silicate, talc, syndiotactic-1,2-polybutadiene, titanium oxide, clay, silicate, talc, mica, tungsten, vermiculite, and hydrotalcite, but the present invention is not limited thereto.

The content of the reinforcing agent may be 10 to 200 parts by weight, for example, 10 parts by weight, 20 parts by weight, 30 parts by weight, 40 parts by weight, 50 parts by weight, 60 parts by weight, 70 parts by weight, 80 parts by weight, 90 parts by weight, 100 parts by weight, 110 parts by weight, 120 parts by weight, 130 parts by weight, 140 parts by weight, 150 parts by weight, 160 parts by weight, 170 parts by weight, 180 parts by weight, 190 parts by weight, 200 parts by weight, or a range between two thereof, based on 100 parts by weight of the sum of the rubber polymer and the second rubber, but the present invention is not limited thereto.

The rubber composition may further include at least one additive selected from the group consisting of a processing oil, a vulcanizing agent, a vulcanization accelerator, a coupling agent, an antioxidant, an emollient, and an adhesive.

The rubber composition may be used in tires, for example, as rubber for tread, rubber for a sidewall, and the like, but the present invention is not limited thereto.

Hereinafter, exemplary embodiments of the present invention will be described in more detail. However, hereinafter, only experimental results obtained from a few selected exemplary embodiments of the present invention will be described, and the scope and contents of the present invention should not be interpreted as being reduced or limited by the few selected exemplary embodiments. The effects of each of the various embodiments of the present invention which are not explicitly set forth below will be described in detail in relevant sections.

Preparation Example 1-1

Diethyl iminodiacetate (8.0 g, 0.04 mol) of Chemical Formula 1-1, methylene chloride (40 mL), and trimethylamine (2.3 g, 0.04 mol) were mixed and cooled to −10° C. in a 200 mL reactor filled with nitrogen. Trimethylchlorosilane (4.3 g, 0.04 mol) was slowly added, the temperature was raised to room temperature, and stirring was performed. After filtration, a solvent was removed under reduced pressure, washing with acetonitrile and heptane was performed, and then only a heptane layer was separated and concentrated to obtain 8.2 g (yield: 82%) of a compound.

The obtained compound was confirmed to have a structure of Chemical Formula 1-2 by nuclear magnetic resonance (NMR) analysis, and results thereof are as follows.

$^1$H NMR (400 MHz, CDCl$_3$) δ 0.12 (S, CH$_3$), δ 1.15 (t, CH$_3$), δ 3.34 (S, CH$_2$), δ 4.05 (q, CH$_2$)

$^{13}$C NMR (100 MHz, CDCl$_3$) δ 1.96 (CH$_3$), δ 14.3 (CH$_3$), δ 50.2 (CH$_2$), δ 60.9 (CH$_2$), δ 171.8 (C)

[Chemical Formula 1-1]

[Chemical Formula 1-2]

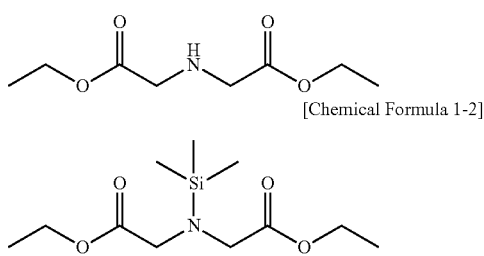

Preparation Example 1-2

Tetraethyl 2,2'-((2-methylpentane-1,5-diyl) bis(ananediyl))disuccinate (19.0 g, 0.04 mol) of Chemical Formula 2-1, methylene chloride (40 mL), and trimethylamine (4.6 g, 0.08 mol) were mixed and cooled to −10° C. in a 200 mL reactor filled with nitrogen. Trimethylchlorosilane (8.6 g, 0.08 mol) was slowly added, the temperature was raised to room temperature, and stirring was performed. After filtration, a solvent was removed under reduced pressure, washing with acetonitrile and heptane was performed, and then only a heptane layer was separated and concentrated to obtain 20 g (yield: 80%) of a compound of Chemical Formula 2-2.

The obtained compound was confirmed to have a structure of Chemical Formula 2-2 by NMR analysis, and results thereof are as follows.

$^1$H NMR (400 MHz, CDCl$_3$) δ 0.08 (S, CH$_3$), δ 0.7 (d, CH$_3$), δ 1.1 (q, CH$_3$), δ 1.2 to 1.4 (m, CH$_2$), δ 2.05 to 2.2 (m, CH$_2$), δ 2.2 to 2.4 (m, CH$_2$), δ 2.4 to 2.6 (m, CH$_2$), δ 3.4 (q, CH$_2$), δ 3.9 to 4.0 (m, CH$_2$)

$^{13}$C NMR (100 MHz, CDCl$_3$) δ 1.63 (CH$_3$), δ 14.1 (CH$_3$), δ 17.8 (CH$_3$), δ 27.3 (CH$_2$), δ 27.4 (CH$_2$), δ 32.0 (CH$_2$), δ 32.1 (CH$_2$), δ 33.2 (CH$_2$), δ 33.3 (CH), δ 38.0 (CH$_2$), δ 38.1 (CH$_2$), δ 48.2 (CH$_2$), δ 54.1 (CH$_2$), δ 54.2 (CH$_2$), δ 57.7 (CH) δ 58.0 (CH), δ 58.1 (CH), δ 60.4 (CH$_2$), δ 60.5 (CH$_2$), δ 60.8 (CH$_2$), δ 61.1 (CH$_2$), δ 170.7 (C), δ 173.5 (C), δ 173.6 (C), δ 173.7 (C)

[Chemical Formula 2-1]

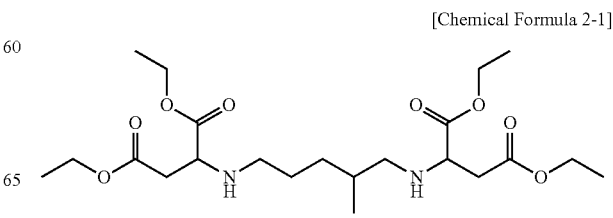

[Chemical Formula 2-2]

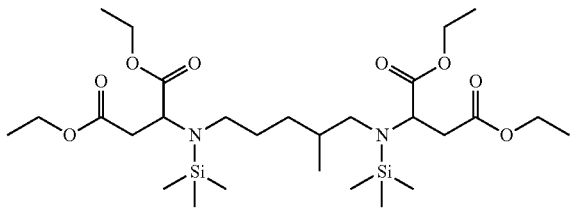

Preparation Example 1-3

Dilauryl 3,3-thiodipropionate of Chemical Formula 3-1 was commercially purchased and used.

Ethyl thioglycolate (5.0 g, 0.04 mol), dimethylformamide (40 mL), and triethylamine (4.0 g, 0.04 mol) were mixed and cooled to −10° C. in a 200 mL reactor filled with nitrogen. The temperature was slowly raised to room temperature, and stirring was performed. The reaction product was extracted with diethyl ether, and then an organic layer was separated and washed with water. After filtration, a solvent was removed under reduced pressure, and concentration was performed to obtain 3.8 g (yield: 80%) of a compound.

The obtained compound was confirmed to have a structure of Chemical Formula 3-2 by NMR analysis, and results thereof are as follows.

$^1$H NMR (400 MHz, CDCl$_3$) δ 1.0 (t, CH$_3$), δ 3.5 (s, CH$_2$), δ 4.2 (q, CH$_2$)

$^{13}$C NMR (100 MHz, CDCl$_3$) δ 14 (CH$_3$), δ 42 (CH$_2$), δ 62 (CH$_2$), δ 170 (C)

[Chemical Formula 4-2]

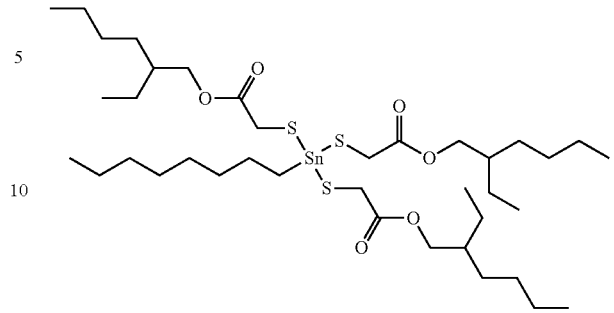

Comparative Example 1

A unimolecular neodymium versatate (1.2 mmol) solution was mixed with 1,3-butadiene (15.6 mmol), and then diisobutylaluminum hydride (15.9 mmol), triisobutylaluminum (16.2 mmol), and diisobutylaluminum chloride (2.6 mmol) were added to prepare a catalyst. In this case, the amount of neodymium in unimolecular neodymium versatate was 1.5×10$^{-4}$ mole per 100 g of a single molecule.

A polymerization reaction was performed by sufficiently blowing nitrogen into a 5 L glass pressure reactor and adding a cyclohexane polymerization solvent 5 times the amount of monomers. The catalyst was added by transference under nitrogen charge, then butadiene (400 g) as a monomer was added, and a polymerization reaction was performed at 70° C. for 2 hours. After the polymerization reaction, a reaction terminator and an antioxidant were added to terminate the reaction, thereby obtaining 1,4-polybutadiene.

[Chemical Formula 3-1]

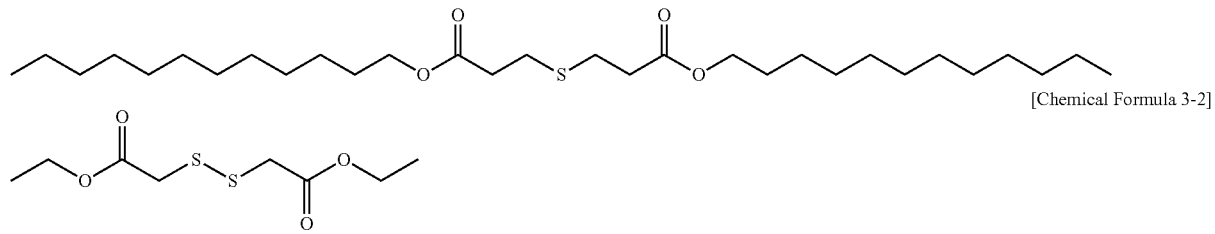

[Chemical Formula 3-2]

Dioctyltin bis(2-ethylhexyl thioglycolate) of Chemical Formula 4-1 and octyltin tris(2-ethylhexyl thioglycolate) of Chemical Formula 4-2 were commercially purchased and used.

Preparation Example 1-4

Methyltin mercaptide of Chemical Formula 4-1 and octyltin mercaptide of Chemical Formula 4-2 were commercially purchased and used.

[Chemical Formula 4-1]

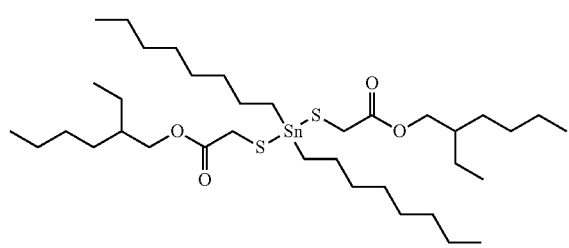

Example 1

A unimolecular neodymium versatate (1.2 mmol) solution was mixed with 1,3-butadiene (15.6 mmol), and then diisobutylaluminum hydride (15.9 mmol), triisobutylaluminum (16.2 mmol), and diisobutylaluminum chloride (2.6 mmol) were added to prepare a catalyst. In this case, the amount of neodymium in unimolecular neodymium versatate was 1.5×10$^{-4}$ mole per 100 g of a single molecule.

A polymerization reaction was performed by sufficiently blowing nitrogen into a 5 L glass pressure reactor and adding a cyclohexane polymerization solvent 5 times the amount of monomers. The catalyst was added by transference under nitrogen charge, then butadiene (400 g) as a monomer was added, and a polymerization reaction was performed at 70° C. for 2 hours. After the polymerization reaction, the compound of Chemical Formula 1-1 was slowly added and allowed to react for 50 minutes, and a reaction terminator and an antioxidant were added to terminate the reaction, thereby obtaining functionalized 1,4-polybutadiene.

Example 2

Functionalized 1,4-polybutadiene was obtained in the same manner as in Example 1, except that the compound of Chemical Formula 1-2 was added instead of the compound of Chemical Formula 1-1.

Example 3

Functionalized 1,4-polybutadiene was obtained in the same manner as in Example 1, except that the compound of Chemical Formula 2-1 was added instead of the compound of Chemical Formula 1-1.

Example 4

Functionalized 1,4-polybutadiene was obtained in the same manner as in Example 1, except that the compound of Chemical Formula 2-2 was added instead of the compound of Chemical Formula 1-1.

Example 5

Functionalized 1,4-polybutadiene was obtained in the same manner as in Example 1, except that the compound of Chemical Formula 3-1 was added instead of the compound of Chemical Formula 1-1.

Example 6

Functionalized 1,4-polybutadiene was obtained in the same manner as in Example 1, except that the compound of Chemical Formula 3-2 was added instead of the compound of Chemical Formula 1-1.

Example 7

Functionalized 1,4-polybutadiene was obtained in the same manner as in Example 1, except that the compound of Chemical Formula 4-1 was added instead of the compound of Chemical Formula 1-1.

Example 8

Functionalized 1,4-polybutadiene was obtained in the same manner as in Example 1, except that the compound of Chemical Formula 4-2 was added instead of the compound of Chemical Formula 1-1.

Experimental Example 1

The characteristics of 1,4-polybutadiene prepared according to Comparative Example 1 and Examples 1 to 4 were analyzed, and results thereof are shown in Table 1 below.
Each analysis method is as follows.

1) Measurement of Mooney Viscosity 30 g of each solid rubber was taken and pressed using a roller to prepare two samples with a thickness of 0.8 cm and an area of 5 cm×5 cm. The samples were attached to front and rear surfaces of a rotor, and the rotor was mounted on a rotational viscometer (MOONEY MV2000 commercially available from ALPHA Technologies). The rotor was preheated to 100° C. for 1 minute and operated to measure a 4-minute change in viscosity of the solid rubber, thereby obtaining Mooney viscosity expressed as ML1+4 (100° C.).

2) Measurement of Cis Content

To confirm the microstructure of solid rubber, the content of each was measured by the Morero method. 40 mg of a solid rubber sample was completely dissolved in 5 mL of $CS_2$, and then the rubber solution was placed in KBr cells with an interval of 1 mm and measured using an infrared spectrometer (FTS-60A commercially available from BIO-RAD). In this case, the infrared peaks to be measured are the cis absorbance (AC) at 739 $cm^{-1}$, the vinyl absorbance (AV) at 912 $cm^{-1}$, and the trans absorbance (AT) at 966 $cm^{-1}$. The content of each microstructure was calculated from the measured absorbance using the following formulas.

⟨Formulas⟩

$C = (1.7455 \times AC - 0.0151 \times AV)$ $V = (0.3746 \times AV - 0.0070 \times AC)$ $T = (0.4292 \times AT - 0.0129 \times AV - 0.0454 \times AC)$ $Cis(\%) = \frac{C}{C+V+T} \times 100$ $Trans(\%) = \frac{T}{C+V+T} \times 100$ $Vinyl(\%) = \frac{V}{C+V+T} \times 100$ 3) Measurement of Solution Viscosity The solidified and dried sample was dissolved in toluene so that the concentration was 5.23 wt %, and viscosity at 25° C. (cps@25° C.) was measured using an automatic viscometer.

4) Measurement of Cold Flowability

Cold flowability was measured by extruding rubber through a ¼-inch orifice under a pressure of 3.5 psi and a temperature of 50° C. After reaching a steady state for 10 minutes, an extrusion rate (mg/min) was measured to confirm cold flowability.

TABLE 1

| Classification | GPC | | | Solution viscosity (SV, cps) | Mooney viscosity (MV) | Degree of branching (MV/SV) * 10 | Cold flow-ability (mg/min) | Cis/Trans/Vinyl (%) |
|---|---|---|---|---|---|---|---|---|
| | Ma | Mw | MWD | | | | | |
| Comparative Example 1 | 235 | 541 | 2.30 | 237 | 45 | 1.9 | 0.5 | 96.9/2.0/1.1 |

TABLE 1-continued

| Classification | GPC Mn | GPC Mw | GPC MWD | Solution viscosity (SV, cps) | Mooney viscosity (MV) | Degree of branching (MV/SV) * 10 | Cold flowability (mg/min) | Cis/Trans/Vinyl (%) |
|---|---|---|---|---|---|---|---|---|
| Example 1 | 250 | 562 | 2.25 | 235 | 48 | 2.0 | 0.4 | 97.2/1.8/1.0 |
| Example 2 | 245 | 557 | 2.27 | 232 | 47 | 2.0 | 0.3 | 97.3/1.8/1.0 |
| Example 3 | 256 | 578 | 2.26 | 230 | 47 | 2.0 | 0.3 | 96.8/1.9/1.2 |
| Example 4 | 257 | 586 | 2.28 | 231 | 48 | 2.1 | 0.3 | 97.0/2.1/0.8 |
| Example 5 | 260 | 585 | 2.25 | 232 | 51 | 2.2 | 0.3 | 97.0/2.0/1.0 |
| Example 6 | 274 | 614 | 2.24 | 240 | 51 | 2.1 | 0.3 | 96.8/2.0/1.2 |
| Example 7 | 265 | 630 | 2.38 | 240 | 52 | 2.1 | 0.3 | 97.3/1.9/0.8 |
| Example 8 | 2.59 | 598 | 2.31 | 231 | 50 | 2.2 | 0.4 | 97.2/1.9/0.9 |

Mn: number average molecular weight ($\times 10^3$ g/mol)
Mw: weight average molecular weight ($\times 10^3$ g/mol)
MWD: molecular weight distribution (Mw/Mn)

Referring to Table 1, when compared to Comparative Example 1 not including a separate functional group, Examples 1 to 4 exhibited similar cis/trans/vinyl ratios and were excellent in solution viscosity relative to Mooney viscosity and cold flowability. In addition, Examples 5 to 8 also exhibited similar levels of cis/trans/vinyl ratio to that of Comparative Example 1 and were excellent in solution viscosity relative to Mooney viscosity and cold flowability.

Experimental Example 2

Each 1,4-polybutadiene according to the Comparative Example and Examples was primarily compounded with natural rubber, zinc oxide, stearic acid, and carbon black using a 500 cc Brabender mixer at 120° C. according to conditions shown in Tables 2 and 3 below, and then the resulting compound was mixed with sulfur and a vulcanization accelerator and stirred to prepare a secondary compound. The secondary compound was kneaded in a roll mill set at 80° C., then processed into a flat sheet on a 2 mm-thick roller, and allowed to stand for 24 hours. The resulting sheet was vulcanized as much as the crosslinking time measured in RPA using a press at 160° C. to prepare a 2 mm-thick sheet sample for measuring properties.

The compounds including 1,4-polybutadiene according to Comparative Example 1 and Examples 1 to 8 were named Comparative Preparation Example 2 and Preparation Examples 2-1 to 2-8, respectively.

TABLE 2

| Classification | Comparative Preparation Example 2 | Preparation Example 2-1 | Preparation Example 2-2 | Preparation Example 2-3 | Preparation Example 2-4 |
|---|---|---|---|---|---|
| Natural rubber | 50 | 50 | 50 | 50 | 50 |
| Comparative Example 1 | 50 | — | — | — | — |
| Example 1 | — | 50 | — | — | — |
| Example 2 | — | — | 50 | — | — |
| Example 3 | — | — | — | 50 | — |
| Example 4 | — | — | — | — | 50 |
| Carbon black | 50 | 50 | 50 | 50 | 50 |
| Zinc oxide | 3 | 3 | 3 | 3 | 3 |
| Stearic acid | 2 | 2 | 2 | 2 | 2 |
| Antioxidant | 1.5 | 1.5 | 1.5 | 1.5 | 1.5 |
| Sulfur | 1.5 | 1.5 | 1.5 | 1.5 | 1.5 |
| Vulcanization accelerator | 1.5 | 1.5 | 1.5 | 1.5 | 1.5 |

(units: parts by weight)

TABLE 3

| Classification | Comparative Preparation Example 2 | Preparation Example 2-5 | Preparation Example 2-6 | Preparation Example 2-7 | Preparation Example 2-8 |
|---|---|---|---|---|---|
| Natural rubber | 50 | 50 | 50 | 50 | 50 |
| Comparative Example 1 | 50 | — | — | — | — |
| Example 5 | — | 50 | — | — | — |
| Example 6 | — | — | 50 | — | — |
| Example 7 | — | — | — | 50 | — |
| Example 8 | — | — | — | — | 50 |
| Carbon black | 50 | 50 | 50 | 50 | 50 |
| Zinc oxide | 3 | 3 | 3 | 3 | 3 |
| Stearic acid | 2 | 2 | 2 | 2 | 2 |
| Antioxidant | 1.5 | 1.5 | 1.5 | 1.5 | 1.5 |

TABLE 3-continued

| Classification | Comparative Preparation Example 2 | Preparation Example 2-5 | Preparation Example 2-6 | Preparation Example 2-7 | Preparation Example 2-8 |
|---|---|---|---|---|---|
| Sulfur | 1.5 | 1.5 | 1.5 | 1.5 | 1.5 |
| Vulcanization accelerator | 1.5 | 1.5 | 1.5 | 1.5 | 1.5 |

(units: parts by weight)

The mechanical and dynamic properties of the samples were measured and compared, and results thereof are shown in Tables 4 and 5 below. The measurement method of each property is as follows.

Hardness: measured using a Shore-A hardness tester.

Moduli at 100% and 300% elongation: determined by measuring stress applied to a sample when the sample was elongated by 100% and 300% at 25° C. (units: $kgf/cm^2$)

Tensile strength: measured in accordance with ASTM D 790 (units: $kgf/cm^2$).

Elongation rate: determined by measuring a strain value until a sample was broken using a tensile tester (units: %)

Dynamic property value of vulcanized rubber (tan δ, E", E', E*): analyzed at 0° C. and 60° C. using a DMTA 5 instrument commercially available from Rheometrics.

DIN Loss: determined by measuring the amount of a sample surface crumbled and peeled off through repetitive mechanical motion (units: g)

TABLE 4

| Classification | Comparative Preparation Example 2 | Preparation Example 2-1 | Preparation Example 2-2 | Preparation Example 2-3 | Preparation Example 2-4 |
|---|---|---|---|---|---|
| Compound Mooney viscosity | 76 | 76.5 | 74 | 75 | 73 |
| Hardness (Shore A) | 69 | 69 | 70 | 70 | 70 |
| Modulus at 100% elongation | 34.2 | 33.9 | 33.5 | 33.3 | 33.6 |
| Modulus at 300% elongation | 136.0 | 139.7 | 135.7 | 136.8 | 137.2 |
| Tensile strength | 203.5 | 207.9 | 204.8 | 211.8 | 212.9 |
| Elongation rate | 421.2 | 420.9 | 422.9 | 436.1 | 432.8 |
| tanδ @0° C. | 0.117 | 0.120 | 0.121 | 0.115 | 0.114 |
| tanδ @60° C. | 0.093 | 0.087 | 0.084 | 0.085 | 0.081 |
| DIN Loss | 0.122 | 0.120 | 0.122 | 0.117 | 0.118 |

TABLE 5

| Classification | Comparative Preparation Example 2 | Preparation Example 2-5 | Preparation Example 2-6 | Preparation Example 2-7 | Preparation Example 2-8 |
|---|---|---|---|---|---|
| Compound Mooney viscosity | 76 | 73 | 72 | 73 | 73 |
| Hardness (Shore A) | 69 | 70 | 70 | 69 | 70 |
| Modulus at 100% elongation | 34.2 | 34.0 | 33.9 | 34.1 | 34.5 |
| Modulus at 300% elongation | 136.0 | 139.1 | 135.4 | 140.3 | 141.1 |
| Tensile strength | 203.5 | 208.5 | 213.1 | 219.4 | 208.6 |
| Elongation rate | 421.2 | 439.2 | 440.8 | 429.4 | 422.2 |
| tanδ @0° C. | 0.117 | 0.118 | 0.124 | 0.119 | 0.123 |
| tanδ @60° C. | 0.093 | 0.081 | 0.082 | 0.084 | 0.083 |
| DIN Loss | 0.122 | 0.123 | 0.120 | 0.116 | 0.115 |

Referring to Table 4, when compared to Comparative Preparation Example 2, Preparation Example 2-1 exhibited a similar compound Mooney viscosity, and Preparation Examples 2-2 to 2-4 exhibited decreased compound Mooney viscosities, and thus it can be confirmed that processability was improved.

In addition, in the case of Preparation Examples 2-1 to 2-4, tensile strength and abrasion resistance were excellent, and particularly, tan δ values at 60° C. directly related to fuel efficiency were remarkably excellent as compared to Comparative Preparation Example 2.

In the case of Preparation Examples 2-1 and 2-2 including the compound of Chemical Formula 1, tan δ at 0° C. indicating braking performance was also excellent, and in the case of Preparation Examples 2-3 and 2-4 including the compound of Chemical Formula 2, mechanical properties such as processability, tensile strength, an elongation rate, abrasion resistance, and the like were excellent.

Referring to Table 5, when compared to Comparative Preparation Example 2, Preparation Examples 2-5 to 2-8 exhibited decreased compound Mooney viscosities, and thus it can be confirmed that processability was significantly improved.

In the case of Preparation Example 2-5, tensile strength and an elongation rate were excellent, and fuel efficiency was significantly improved as compared to Comparative Preparation Example 2. In the case of Preparation Example 2-6, tensile strength and an elongation rate were improved, and fuel efficiency was also significantly improved. In the case of Preparation Example 2-7, tensile strength and abrasion resistance were excellent, and fuel efficiency was improved. In the case of Preparation Example 2-8, tensile strength and abrasion resistance were excellent, and fuel efficiency was improved.

Experimental Example 3

Each 1,4-polybutadiene according to the Comparative Example and Examples was compounded with solution-polymerized styrene-butadiene rubber, silica, and other compositions using a 500 cc Brabender mixer according to conditions shown in Tables 6 and 7 below to prepare a rubber composition, and mixed rubber was prepared from the composition in an open-type two roll mill and then vulcanized to prepare a rubber sample.

The compounds including 1,4-polybutadiene according to Comparative Example 1 and Examples 1 to 8 were named Comparative Preparation Example 3 and Preparation Examples 3-1 to 3-8, respectively.

TABLE 6

| Classification | Comparative Preparation Example 3 | Preparation Example 3-1 | Preparation Example 3-2 | Preparation Example 3-3 | Preparation Example 3-4 |
|---|---|---|---|---|---|
| SSBR | 70 | 70 | 70 | 70 | 70 |
| Comparative Example 1 | 30 | — | — | — | — |
| Example 1 | — | 30 | — | — | — |
| Example 2 | — | — | 30 | — | — |
| Example 3 | — | — | — | 30 | — |
| Example 4 | — | — | — | — | 30 |
| Silica | 80 | 80 | 80 | 80 | 80 |
| Oil | 30 | 30 | 30 | 30 | 30 |
| Zinc oxide | 3 | 3 | 3 | 3 | 3 |
| Stearic acid | 2 | 2 | 2 | 2 | 2 |
| Antioxidant | 1.5 | 1.5 | 1.5 | 1.5 | 1.5 |
| Sulfur | 1.5 | 1.5 | 1.5 | 1.5 | 1.5 |
| CBS | 1.8 | 1.8 | 1.8 | 1.8 | 1.8 |
| DPG | 1.8 | 1.8 | 1.8 | 1.8 | 1.8 |

(units: parts by weight)

TABLE 7

| Classification | Comparative Preparation Example 3 | Preparation Example 3-5 | Preparation Example 3-6 | Preparation Example 3-7 | Preparation Example 3-8 |
|---|---|---|---|---|---|
| SSBR | 70 | 70 | 70 | 70 | 70 |
| Comparative Example 1 | 30 | — | — | — | — |
| Example 5 | — | 30 | — | — | — |
| Example 6 | — | — | 30 | — | — |
| Example 7 | — | — | — | 30 | — |
| Example 8 | — | — | — | — | 30 |
| Silica | 80 | 80 | 80 | 80 | 80 |
| Oil | 30 | 30 | 30 | 30 | 30 |
| Zinc oxide | 3 | 3 | 3 | 3 | 3 |
| Stearic acid | 2 | 2 | 2 | 2 | 2 |
| Antioxidant | 1.5 | 1.5 | 1.5 | 1.5 | 1.5 |
| Sulfur | 1.5 | 1.5 | 1.5 | 1.5 | 1.5 |
| CBS | 1.8 | 1.8 | 1.8 | 1.8 | 1.8 |
| DPG | 1.8 | 1.8 | 1.8 | 1.8 | 1.8 |

(units: parts by weight)

The mechanical and dynamic properties of the samples were measured and compared, and results thereof are shown in the following Tables 8 and 9. The measurement method of each property is as described above.

TABLE 8

| Classification | Comparative Preparation Example 3 | Preparation Example 3-1 | Preparation Example 3-2 | Preparation Example 3-3 | Preparation Example 3-4 |
|---|---|---|---|---|---|
| Compound Mooney viscosity | 96 | 94 | 93 | 95 | 95 |
| Hardness (Shore A) | 72 | 72 | 72 | 72 | 72 |
| Modulus at 100% elongation | 37.6 | 39.7 | 39.1 | 39.4 | 38.4 |
| Modulus at 300% elongation | 142.9 | 146.7 | 143.8 | 143.4 | 144.8 |
| Tensile strength | 190.2 | 189.3 | 194.6 | 195.9 | 193.8 |
| Elongation rate | 373.6 | 376.9 | 380.1 | 383.9 | 378.8 |
| tanδ @0° C. | 0.251 | 0.249 | 0.246 | 0.244 | 0.247 |
| tanδ @60° C. | 0.106 | 0.101 | 0.098 | 0.098 | 0.096 |
| DIN Loss | 0.197 | 0.190 | 0.192 | 0.193 | 0.195 |

TABLE 9

| Classification | Comparative Preparation Example 3 | Preparation Example 3-5 | Preparation Example 3-6 | Preparation Example 3-7 | Preparation Example 3-8 |
|---|---|---|---|---|---|
| Compound Mooney viscosity | 96 | 93 | 92 | 94 | 92 |
| Hardness (Shore A) | 72 | 73 | 73 | 71 | 71 |
| Modulus at 100% elongation | 37.6 | 40.1 | 39.8 | 39.0 | 40.8 |
| Modulus at 300% elongation | 142.9 | 148.8 | 149.9 | 146.1 | 147.5 |
| Tensile strength | 190.2 | 192.8 | 196.8 | 197.5 | 191.8 |
| Elongation rate | 373.6 | 390.8 | 391.8 | 393.2 | 380.8 |
| tanδ @0° C. | 0.251 | 0.253 | 0.255 | 0.243 | 0.245 |
| tanδ @60° C. | 0.106 | 0.091 | 0.093 | 0.095 | 0.097 |
| DIN Loss | 0.197 | 0.188 | 0.190 | 0.185 | 0.189 |

Referring to Table 8, all of the samples of Preparation Examples 3-1 to 3-4 exhibited excellent processability compared to Comparative Preparation Example 3. Also, modulus at 100% or 300% elongation and abrasion resistance were excellent, and thus mechanical properties were improved.

In addition, in the case of Preparation Examples 3-1 to 3-4, tan δ values at 60° C. directly related to fuel efficiency were remarkably excellent compared to Comparative Preparation Example 2.

Referring to Table 9, all of the samples of Preparation Examples 3-5 to 3-8 exhibited decreased Mooney viscosities compared to Comparative Preparation Example 3, and thus processability was excellent. Also, moduli at elongation, tensile strength, and elongation rates were increased, and thus mechanical properties were improved. In the case of all of Preparation Examples 3-5 to 3-8, tan δ values at 60° C. directly related to fuel efficiency were remarkably excellent.

According to some aspects, a rubber polymer, whose productivity, processability, mechanical properties, and viscoelasticity are excellent, and a rubber composition including the same can be provided.

However, it is to be understood that the effects of the present invention are not limited to the above-described effects but include all effects deducible from the configuration described in the detailed description of the present invention or in the claims.

The foregoing description of the present invention is intended for illustration, and it will be understood by those skilled in the art to which the present invention pertains that the present invention can be easily modified and implemented in various other forms without changing the technical spirit or essential features of the present invention. Therefore, it should be understood that the embodiments described above are only exemplary in all aspects and not limiting. For example, each of the constituents described as being one combined entity may be implemented separately, and similarly, constituents described as being separate entities may be implemented in a combined form.

It should be understood that the scope of the present invention is defined by the following claims and that all changes or modifications derived from the meaning and scope of the claims and their equivalents are included in the scope of the present invention.

What is claimed is:

1. A rubber polymer comprising a unit structure derived from a conjugated diene-based monomer and at least one of compounds represented by the following Chemical Formula 4:

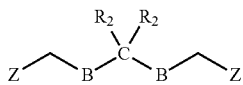
[Chemical Formula 4]

in Chemical Formulas,
B is oxygen or sulfur,
C is silicon or tin,
Z is a functional group represented by the following Chemical Formula Z,

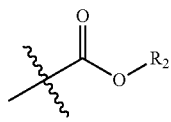
[Chemical Formula Z]

each $R_2$ is independently a C1 to C20 linear or branched substituted or unsubstituted alkyl group, a C3 to C20 substituted or unsubstituted cycloalkyl group, or a C6 to C20 substituted or unsubstituted aryl group,
wherein:
the rubber polymer is prepared by using a polymerization system including a neodymium-based catalyst,
the rubber polymer has a degree of branching of 2.0 to 2.5,
the rubber polymer has a molecular weight distribution (Mw/Mn) of 1.5 to 2.5, and
the degree of branching is calculated by the ratio of the Mooney viscosity (MV) and solution viscosity (SV) at 25° C., multiplied by 10(MV/SV*10).

2. The rubber polymer of claim 1, wherein the conjugated diene-based monomer is at least one selected from the group consisting of 1,3-butadiene, isoprene, 2,3-dimethyl-1,3-butadiene, 2,3-dimethylbutadiene, 2-phenyl-1,3-butadiene, 2-chloro-1,3-butadiene, 1,3-pentadiene, 2-methyl-1,3-pentadiene, 3-methyl-1,3-pentadiene, 4-methyl-1,3-pentadiene, 1,3-hexadiene, 2-ethyl-1,3-butadiene, 2,4-hexadiene, and cyclo1,3-hexadiene.

3. The rubber polymer of claim 1, which satisfies the following condition:
the compound represented by Chemical Formula 4 has a symmetric structure centered on C.

4. The rubber polymer of claim 1, which has a cis bond content of 90% or more.

5. A method of preparing a rubber polymer, comprising the steps of:
(a) allowing a conjugated diene-based monomer to react in the presence of a catalyst; and
(b) allowing the product of the step (a) to react with at least one of compounds represented by the following Chemical Formula 4:

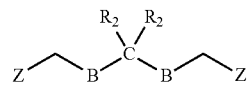
[Chemical Formula 4]

in Chemical Formula,
B is oxygen or sulfur,
C is silicon or tin,
Z is a functional group represented by the following Chemical Formula Z,

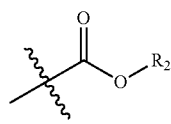
[Chemical Formula Z]

each $R_2$ is independently a C1 to C20 linear or branched substituted or unsubstituted alkyl group, a C3 to C20 substituted or unsubstituted cycloalkyl group, or a C6 to C20 substituted or unsubstituted aryl group,
wherein:
the rubber polymer is prepared by using a polymerization system including a neodymium-based catalyst,
the rubber polymer has a degree of branching of 2.0 to 2.5,
the rubber polymer has a molecular weight distribution (Mw/Mn) of 1.5 to 2.5, and
the degree of branching is calculated by the ratio of the Mooney viscosity (MV) and solution viscosity (SV) at 25° C., multiplied by 10(MV/SV*10).

6. The method of claim 5, wherein the catalyst is a neodymium-based catalyst prepared from a unimolecular neodymium salt compound.

7. The method of claim 5, wherein the unimolecular neodymium salt compound is at least one selected from the group consisting of neodymium hexanoate, neodymium heptanoate, neodymium octanoate, neodymium octoate, neodymium naphthenate, neodymium stearate, neodymium versatate, neodymium bis(2-ethylhexyl)phosphate, neodymium bis(1-methylheptyl)phosphate, neodymium(mono-2-ethylhexyl-2-ethylhexyl)phosphonate, and neodymium bis(2-ethylhexyl)phosphite.

8. The method of claim 6, wherein the catalyst is formed by mixing the unimolecular neodymium salt compound, a conjugated diene-based monomer, an organoaluminum chloride compound, and one or more organoaluminum compounds in a molar ratio of 1:5 to 30:1 to 5:10 to 30 and aging the mixture.

9. A rubber composition comprising:
the rubber polymer according to claim 1;
at least one second rubber selected from the group consisting of natural rubber, polybutadiene rubber, polyisoprene rubber, butyl rubber, ethylene-propylene-diene ternary copolymer rubber, and styrene-butadiene rubber; and
a reinforcing agent.

* * * * *